United States Patent [19]
Montgomery, Jr.

[11] Patent Number: 5,197,641
[45] Date of Patent: Mar. 30, 1993

[54] SPARE TIRE CARRIER APPARATUS

[75] Inventor: Mike E. Montgomery, Jr., Houston, Tex.

[73] Assignee: L & M Sales, Inc., LaGrange, Tex.

[21] Appl. No.: 770,223

[22] Filed: Oct. 2, 1991

Related U.S. Application Data

[63] Continuation-in-part of Ser. No. 656,859, Feb. 19, 1991.

[51] Int. Cl.⁵ .............................................. B62D 43/00
[52] U.S. Cl. ............................ 224/42.021; 224/42.23; 414/463; 414/466
[58] Field of Search ............... 224/42.21, 42.23, 42.25, 224/42.41, 42.12, 42.06; 414/462, 463, 465, 466; 403/118, 46, 43, 320; 211/23; 248/188.4, 200.1

[56] References Cited

U.S. PATENT DOCUMENTS

| | | | |
|---|---|---|---|
| 1,672,356 | 6/1928 | Wasserfallen | 224/42.21 X |
| 2,494,411 | 1/1950 | Simi | 414/465 |
| 2,574,465 | 11/1951 | Clark | 224/42.21 |
| 2,635,795 | 4/1953 | White | 414/465 |
| 2,956,716 | 10/1960 | Goulet | 224/42.21 |
| 3,150,853 | 9/1964 | Lisbin | 248/188.4 |
| 3,369,683 | 2/1968 | Richards | 224/42.21 |
| 3,398,846 | 8/1968 | Ragan et al. | 414/466 |
| 3,460,695 | 8/1969 | Steele | 224/42.21 X |
| 3,494,493 | 2/1970 | Fowler | 414/466 |
| 3,620,396 | 11/1971 | Abfalter | 414/466 |
| 3,648,867 | 3/1972 | Beavers | 414/466 |
| 3,718,226 | 2/1973 | Penley | 414/466 |
| 3,785,518 | 1/1974 | Johnson | 414/466 |
| 3,883,018 | 5/1975 | Hoisington | 224/42.21 |
| 3,904,093 | 9/1975 | Hanela | 224/42.21 |
| 4,047,629 | 9/1977 | Klein | 224/42.21 X |
| 4,093,088 | 6/1978 | Hildebrandt et al. | 224/42.21 |
| 4,095,709 | 6/1978 | Eller | 224/42.21 |
| 4,264,260 | 4/1981 | Krakow | 224/42.23 X |
| 4,278,191 | 7/1981 | Mecham | 224/42.21 |
| 4,301,954 | 11/1981 | Briggs | 224/42.21 |
| 4,312,620 | 1/1982 | Muschalek, Jr. | 414/466 |
| 4,522,325 | 6/1985 | McMillan | 224/42.23 X |
| 4,537,555 | 8/1985 | Combs | 224/42.06 |
| 4,632,288 | 12/1987 | Bullock | 224/42.17 |
| 4,711,382 | 12/1987 | Helterbrand | 224/42.23 |
| 4,964,552 | 6/1990 | Terwilliger | 224/42.23 |
| 4,976,384 | 12/1990 | Daniels | 224/42.21 X |

FOREIGN PATENT DOCUMENTS

| | | | |
|---|---|---|---|
| 2659268 | 7/1978 | Fed. Rep. of Germany | 403/320 |
| 2378667 | 9/1978 | France | 224/42.21 |
| 61-57472 | 3/1986 | Japan . | |
| 1047762 | 5/1982 | U.S.S.R. . | |

OTHER PUBLICATIONS

TUK Brochure, TUK Corporation, undated.

*Primary Examiner*—Henry J. Recla
*Assistant Examiner*—Glenn T. Barrett
*Attorney, Agent, or Firm*—Pravel, Gambrell, Hewitt, Kimball & Krieger

[57] ABSTRACT

A carrier apparatus for use on a motor vehicle to store a spare tire mounted on a rim beneath the undercarriage of the vehicle. The apparatus including a spring rod having an upper end and a lower end with the upper end being connected to the vehicle via a mounting assembly. A cradle bar having a forward end attached to the lower end of the spring rod is received in a cradle receiver member to form a telescoping cradle. A rear end of the cradle receiver member is connected to a bracket assembly which is adapted to be secured to the vehicle.

18 Claims, 3 Drawing Sheets

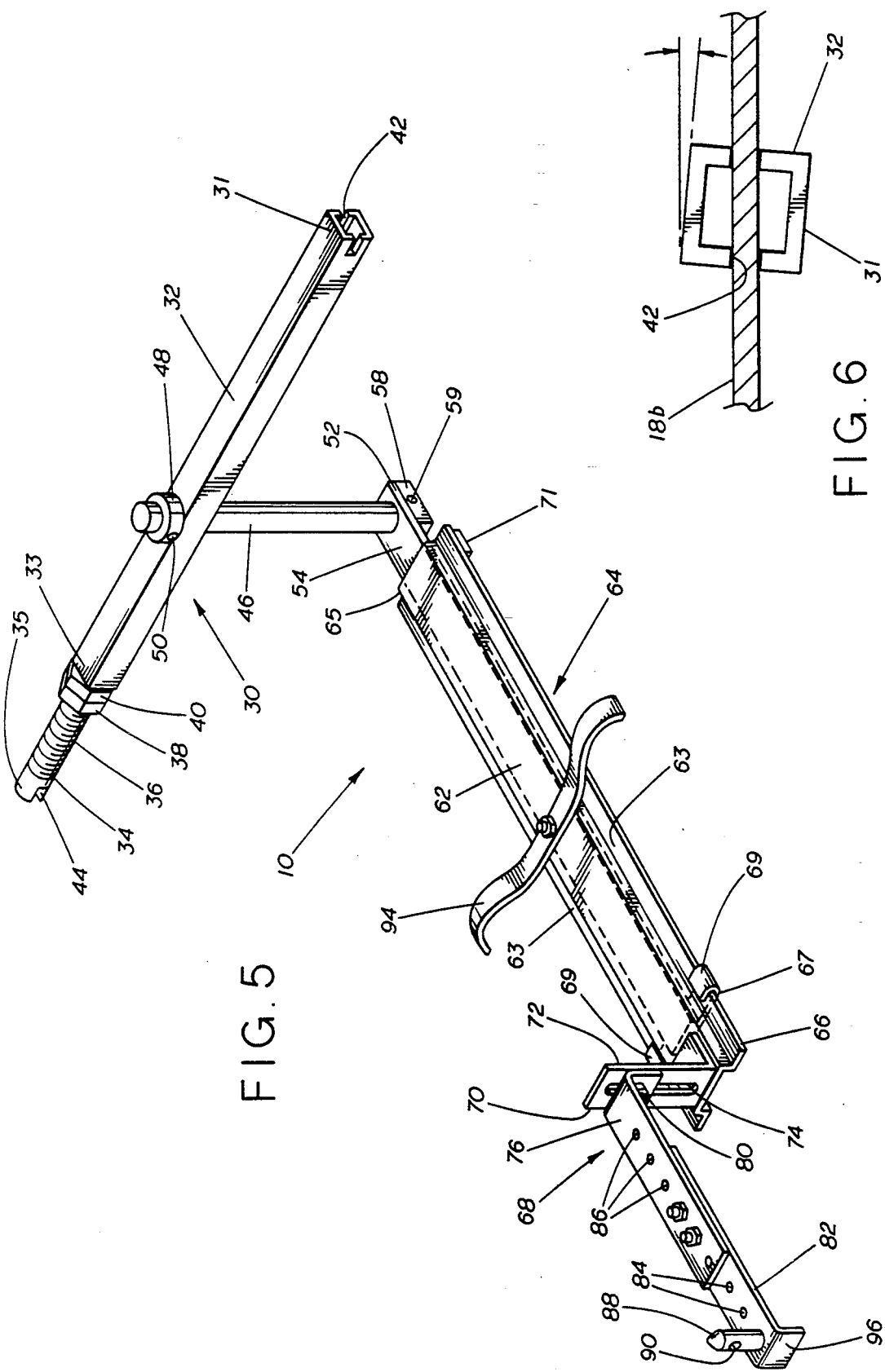

SPARE TIRE CARRIER APPARATUS

SPECIFICATION

This Application is a continuation-in-part of U.S. Pat. application Ser. No. 656,859, filed Feb. 19, 1991. The inventor listed in the present Application is the sole named inventor of U.S. Pat. application Ser. No. 656,859.

BACKGROUND OF THE INVENTION

1. Field of the Invention.

The present invention relates in general to devices used to store a spare tire on a motor vehicle and, in particular, for storage of a spare tire on a truck.

2. Description of the Prior Art.

Most light duty trucks, often referred to as pickup trucks, on the road today carry with them a spare tire and wheel mounted underneath the bed of the truck, generally near or against the underside of the truck frame. Most commonly, the spare tire is mounted horizontally in this location and held in place by a simple straight bracket running underneath the spare tire. The tire carrier provided by the truck manufacturer secures and supports the spare tire and mounts to the truck frame. Typically, the carrier is a bracket that is hinged from the truck frame at one end and bolted to the frame at the other end. The spare tire is removed from the truck by crawling beneath the truck and holding the spare tire and the carrier up while unbolting the bolted end of the bracket. After unbolting, the free end of the carrier is allowed to swing down to the ground, giving access to the spare tire which is normally secured to the carrier with bolts. After the spare tire has been unbolted from the carrier, it is manually dragged from beneath the truck.

This process has many disadvantages. Crawling beneath the truck and holding the carrier and spare tire up while unbolting the bracket with a wrench will almost always result in soiled hands and clothing. Oftentimes, the threaded, bolted connection is "frozen" due to mud or rust in the threads making it virtually impossible to loosen the bolted connection without twisting off the bolt. It also may be physically impossible for an aged or handicapped person, or a person lacking considerable physical strength, because the spare tire and carrier can be very heavy. This process can also result in physical injury, because the spare tire is usually unwieldy, and if it drops unexpectedly, it will usually drop on the person trying to remove it from the vehicle. Additionally, the tire must be unbolted from the bracket and then dragged from beneath the truck. This process requires much time, strength, and know-how, and exposes the person to considerable risk of physical injury and danger while beneath the truck. Furthermore, placement of a tire into the carrier requires the process be repeated in reverse order. Oftentimes, a jack may be required to lift the tire and carrier back into position so that the bolt may be secured. Finally, since removal of the spare tire from the truck is so troublesome, the spare tire will rarely have its air pressure checked, and it is often flat when most needed.

Several attempts have been made to devise a spare tire storage apparatus which makes the spare tire more easily accessible. Many of these still require crawling beneath the truck to release the tire or its carrier from the frame, or to manually pull the tire from beneath the truck. Some such devices require that the rear bumper of the truck, or a portion of the rear bumper, swing out of the way to allow the tire to pivot or slide from beneath the truck without being lowered.

Still others attempt to lower the tire first, such as by turning a bolt to screw the tire bracket downward, or by turning a rack and pinion gear set to lower the tire. Then, the tire is usually manually swung out from beneath the vehicle to the rear of the vehicle.

Certain conditions or situations make it desirable not only to loosen the carrier and spare tire without having to crawl beneath the truck but also to be able to access and remove the spare tire from either the rear or the side of the truck certain obstructions and design features of the truck may prohibit the removal of the spare tire from a certain side or the rear of the truck.

Prior patents which have realized these advantages to some degree are the Johnson U.S. Pat. No. 3,785,518 and the Beavers U.S. Pat. No. 3,648,867. These patents disclose carriers in which the tire can be rotated to the rear or to the sides of the truck. The carriers are positioned diagonally across the rear portion of the vehicle and require modifications to the truck during installation.

It would be desirable to have a spare tire carrier which is versatile to allow removal of the spare tire from either side or the rear of the truck without requiring considerable strength and manual dexterity on the part of the person, and a carrier which can be installed quickly and easily without the necessity of modifying the truck.

SUMMARY OF THE PRESENT INVENTION

The present invention is an improved spare tire carrier apparatus which is accessible from the rear of the vehicle for releasing a carrier bracket without the necessity for the user to crawl beneath the vehicle. The spare tire carrier also allows the spare tire to be removed from either side or the rear of the vehicle. Furthermore, the carrier provides assistance with respect to the weight of the spare tire so that the user does not have to fully support the weight of the spare tire during the placement or removal of the spare tire from the carrier apparatus.

The carrier apparatus includes a transverse carrier support member assembly spanning between two longitudinal vehicle frame members. An upper end of a spring rod is rotatably connected to the approximate midpoint of the transverse carrier support member assembly. A lower end of the spring rod is connected to a forward end of a cradle bar. A cradle receiver member confines the cradle bar in a longitudinally sliding configuration to thus form an extendible, telescoping cradle assembly. A rear end of the cradle receiver member is connected to a carrier bracket assembly which can be secured and locked to a trailer hitch at the rear of the vehicle. A rim stabilizer is attached to the cradle receiver bar for securing the spare tire to the carrier apparatus.

The spare tire is accessed by unlocking the carrier bracket assembly from the vehicle trailer hitch. The weight of the spare tire causes the unrestrained end of the cradle assembly to deflect towards the ground. The weight of the spare tire, however, is opposed by the flexural strength of the spring rod which opposes the downward movement of the unrestrained end of the cradle assembly. The bracket assembly can be pulled to extend the telescoping cradle assembly with the spare tire to the rear of the vehicle or the bracket assembly can be swung to either side of the vehicle prior to extending the telescoping cradle assembly. After the cradle assembly has been extended, the spare tire can be removed from the rim stabilizer. Obviously, to place a spare tire in the carrier apparatus the same steps are repeated in reverse order.

BRIEF DESCRIPTION OF THE DRAWINGS

A better understanding of the present invention may be had by reference to the following drawings and contained numerals therein of which:

FIG. 5 is a perspective view of the apparatus; and

FIG. 6 is a view taken along lines 6—6 of FIG. 2.

DETAILED DESCRIPTION OF THE INVENTION

Figure 1:
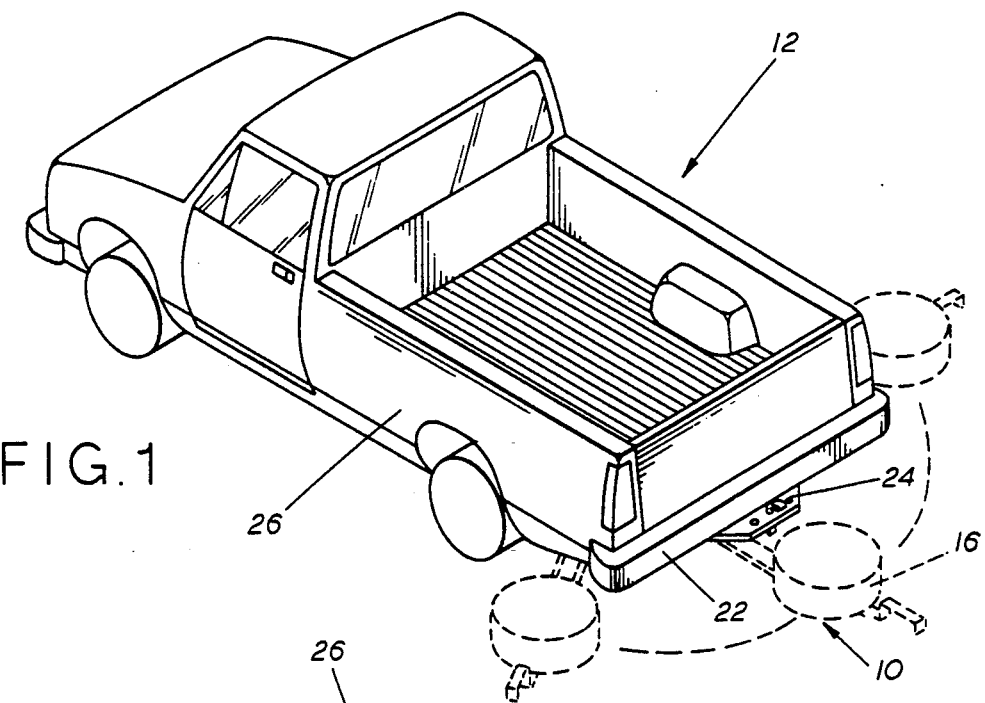
FIG. 1 is a perspective view of the carrier apparatus of the present invention as installed on a typical truck, showing the access positions in dashed lines.

FIG. 1 is a perspective view of a spare tire carrier apparatus according to the present invention, generally indicated by reference numeral 10, as installed on a motor vehicle 12 showing the extended positions. The carrier apparatus 10 is utilized to store a spare tire 16 beneath an undercarriage 14 of the motor vehicle 12 as shown in FIGS. 2 and 3 in the storage position.

The motor vehicle 12 is illustrated as a pickup truck but it may be any vehicle having clearance from the ground level to the undercarriage 14 adequate to allow storage of a spare tire 16 beneath the undercarriage 14 and above the ground level. The rear portion of the truck 12 is shown in FIG. 2 having a pair of parallel longitudinal frame members 18a, 18b, a pair of transverse frame members 19a, 19b, a transverse rear axle 20, a rear bumper 22, and a trailer hitch 24. The frame members 18a, 18b provide support for a vehicle chassis 26. Some trucks 12 do not have the transverse frame members 19a, 19b, but may have a fuel tank (not shown) in this area between the longitudinal frame members 18a, 18b. In either case, the carrier apparatus 10 can easily be utilized as will be explained below.

Figure 2:
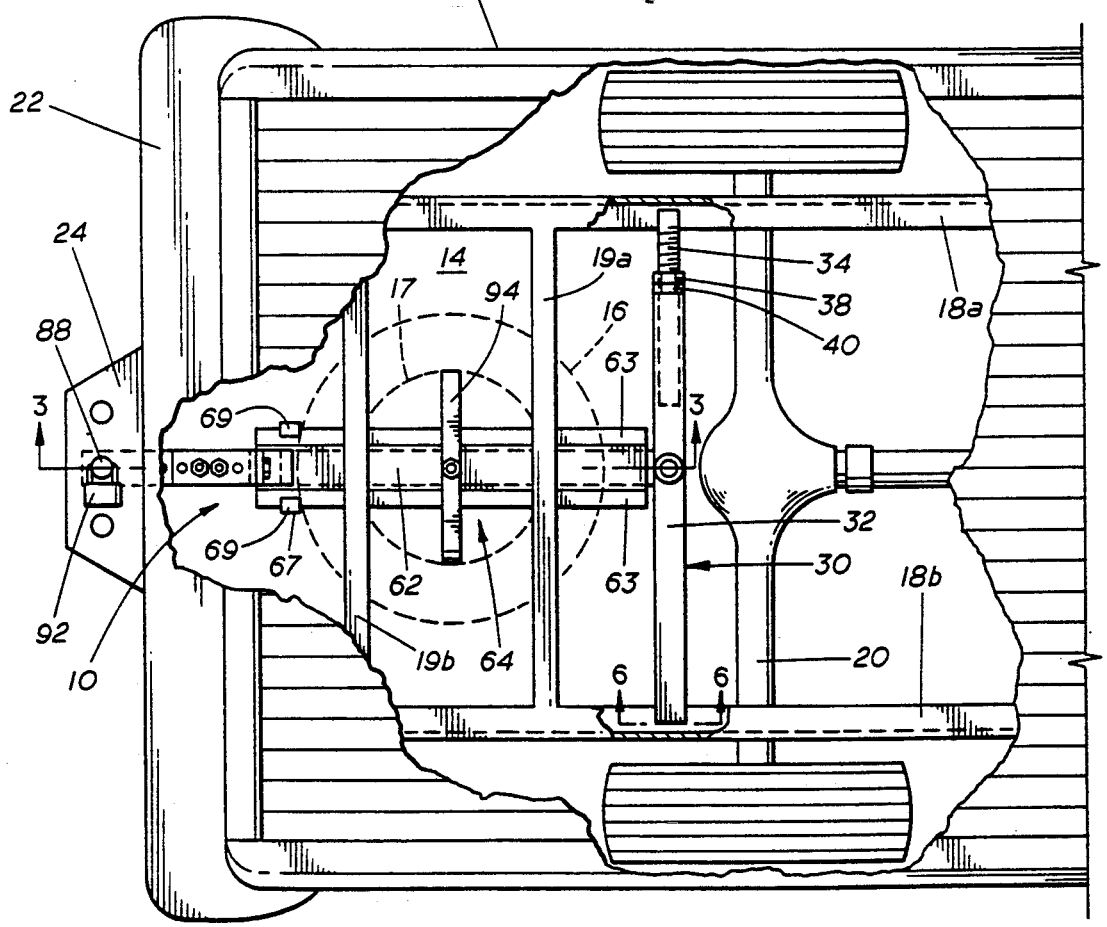
FIG. 2 is a fragmentary plan view of the apparatus of FIG. 1, showing the storage position.
Figure 3:
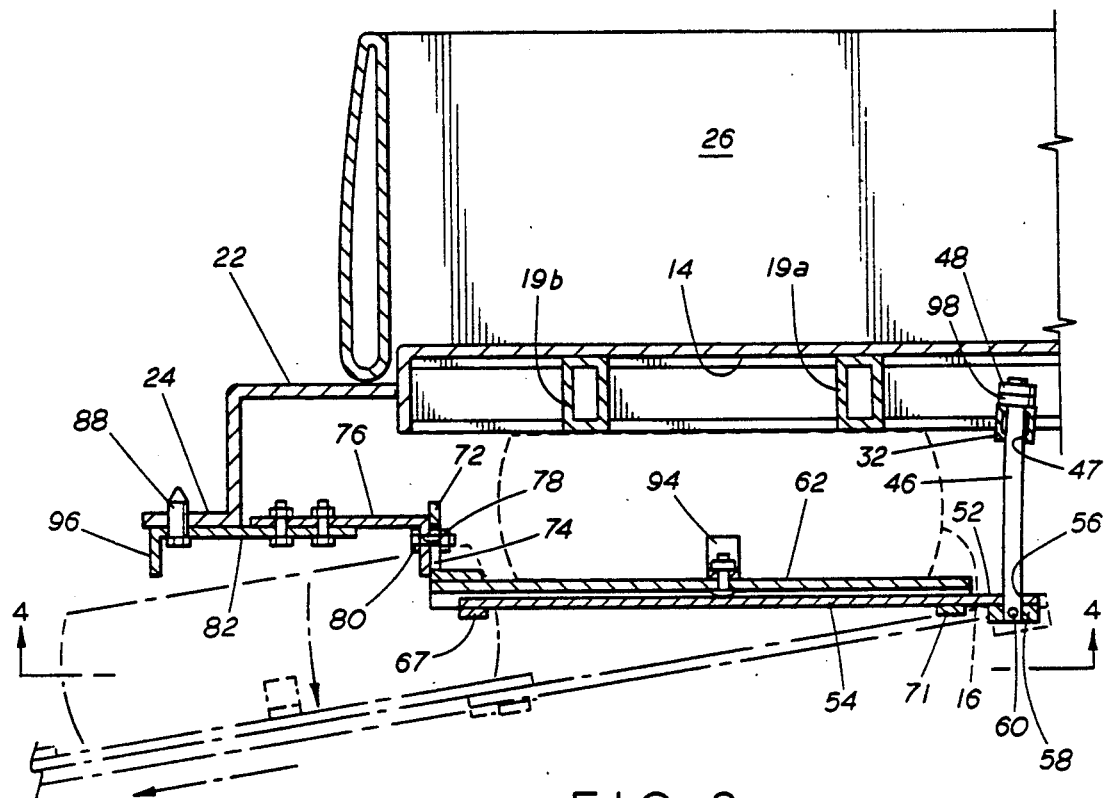
FIG. 3 is a view of the apparatus taken along lines 3—3 of FIG. 2 showing the carrier apparatus in the storage position in solid lines and showing the carrier apparatus in an access position to the rear of the vehicle in dashed lines.
Figure 4:
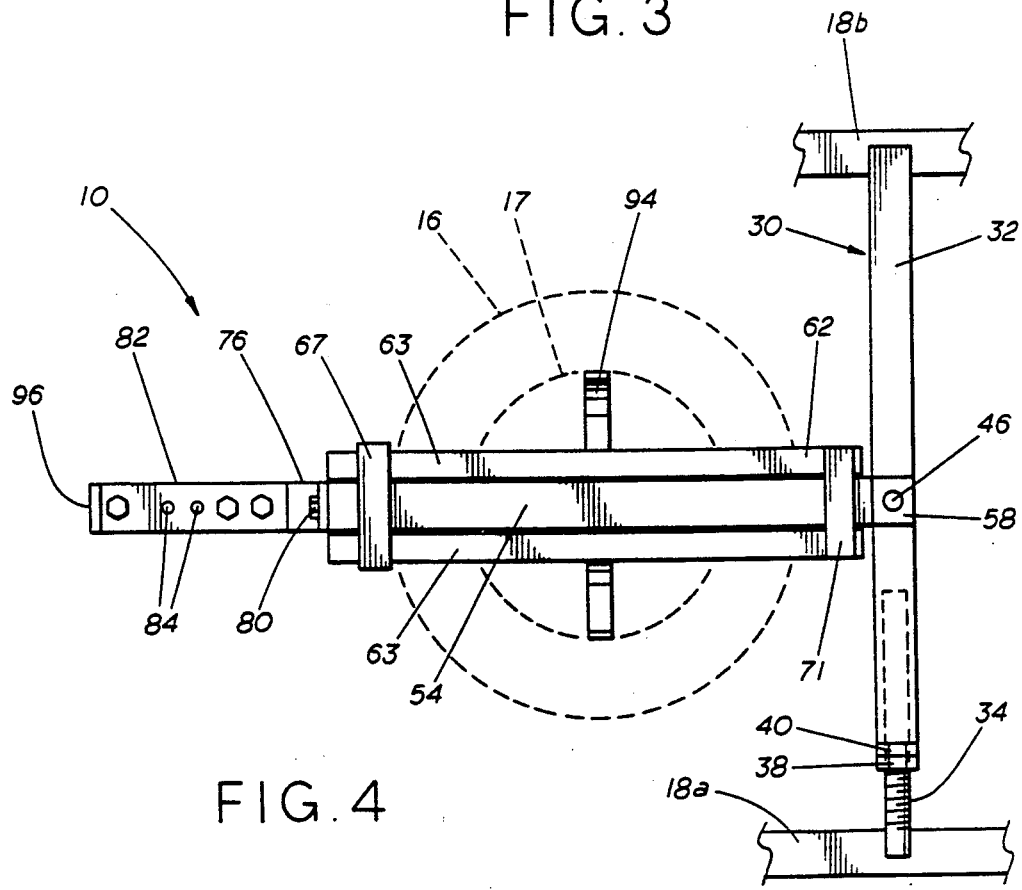
FIG. 4 is a view of the apparatus taken along lines 4—4 of FIG. 3.

Referring to FIGS. 2 and 4 the carrier apparatus 10 includes a transverse carrier support member assembly 30 spanning between the two longitudinal frame members 18a, 18b. As shown in FIG. 5, the transverse carrier support member assembly 30 includes an elongated support member 32, preferably made out of square tubing, and an adjustment screw 34 having external threads 36 for threadably engaging a pair of nuts 38, 40. The elongated support member 32 includes a slot 42 at a first end 31 for mounting the elongated support member 32 to a flange of the frame member 18b as shown in FIGS. 2, 5, and 6. The slot 42 is sized to closely fit over the extending flange of the frame member 18b. As shown in FIG. 6, the slot 42 is skewed with respect to the horizontal axis of the cross-section of the elongated support member 32 at an angle in the range of approximately 5-15° for reasons which will be explained below.

As shown in FIGS. 2, 4, and 5, the adjustment screw 34 includes a slot 44 at a first end 35 of the adjustment screw 34 for mounting the transverse carrier support member assembly 30 to a flange of the frame member 18a. The slot 44 is sized to closely fit over the extending flange of the frame member 18a. As shown in FIGS. 2 and 4, the outside diameter of the adjustment screw 34 is slightly less than the inside diameter of the elongated support member 32 so that the adjustment screw 34 can be inserted into a second end 33 of the elongated support member 32. The pair of nuts 38, 40 on the adjustment screw 34 have an outer diameter greater than the inside diameter of the elongated support member 32 so that the nut 40 bears against the second end 33 of the elongated support member 32 when the carrier support member assembly 30 is mounted to the frame members 18a, 18b.

Referring to FIGS. 2 and 4, to install the transverse carrier support member assembly 30, the nuts 38, 40 are threaded near the slotted end 35 of the adjustment screw 34 and the other end of the adjustment screw 34 is inserted in the second end 33 of the elongated support member 32. The slot 42 of the elongated support member 32 is fitted over the extending flange of the frame member 18b and the adjustment screw 34 is extended from the elongated support member 32 until the slot 44 is fitted over the extending flange of the frame member 18a. The nuts 38, 40 are then drawn tightly against the second end 33 of the elongated support member 32, tightly securing the transverse carrier support member assembly 30 to the frame of the vehicle 12.

As shown in FIG. 5, a spring rod 46 is connected to the approximate midpoint of the transverse carrier support member assembly 30. The spring rod 46 is preferably a spring steel rod having a round cross-section. The spring rod 46 is inserted through a hole 47 in the elongate support member 32 and the upper end of the spring rod 46 is secured with a collar 48 having a pin 50, preferably a roll pin, extending through the collar 48 and the spring rod 46 to thus permit the spring rod 46 to rotate about its longitudinal axis.

In the preferred embodiment, the spring rod 46 is rotatably mounted to the transverse carrier support member assembly 30 so that the lower end of the spring rod 46 is angled in a range of approximately 5-15° with respect to vertical towards the rear of the vehicle 12 as shown in FIG. 3. This is accomplished in the preferred embodiment by skewing the slot 42 in the first end 31 of the elongated support member 32 at the desired angle with respect to the horizontal axis as shown in FIG. 6.

As shown in FIG. 5, a lower end of the spring rod 46 is connected to a forward end 52 of a cradle bar 54. The cradle bar 54 is a substantially flat, elongated bar having a hole 56 extending therethrough at the forward end 52. In the preferred embodiment as shown in FIG. 5, a reinforcing plate 58 having a hole (not shown) aligned with the hole 56 is securely attached, for example by welding, to the forward end 52 of the cradle bar 54. The lower end of the spring rod 46 is inserted through the hole 56 in the cradle bar 54 and the reinforcing plate 58. The cradle bar 54 is secured to the reinforcing plate 58 with a pin 60, preferably a roll pin, extending through a hole 59 in the reinforcing plate 58 and the spring rod 46.

As shown in FIGS. 2, 3, 4, and 5, a cradle receiver member 62 receives and confines the cradle bar 54 in a longitudinally sliding configuration to thus form an extendible, telescoping cradle assembly 64. The cradle receiver member 62 has a pair of horizontal flanges 63 separated by an inverted channel-shaped portion 65, the channel-shaped portion 65 being substantially the same size and shape of the cradle bar 54 so that the cradle bar 54 can slide in the channel-shaped portion 65. A guide plate 67 having raised ends for engaging the flanges 63 of the cradle receiver member 62 is attached to the lower face of the cradle bar 54 near the rear end of the cradle bar 54. A stop plate 71 is attached to the lower face of the cradle receiver member 62. The stop plate 71 will abut the guide plate 67 when the cradle assembly 64 is in the fully extendible position and will prevent the dislocation of the cradle receiver member 62 from the cradle bar 54.

A rear end 66 of the cradle receiver member 62 is connected to a bracket assembly 68 which can be secured and locked to the rear of the vehicle 12, preferably to the trailer hitch 24 at the rear of the vehicle 12. The bracket assembly 68 includes a cradle bracket 70 that attaches to the cradle receiver member 62 and has an upwardly extending portion 72 having an opening 74 therein. The opening 74 is preferably an elongated slot to provide horizontal levelling of the cradle assembly 64 as will be explained below. A middle bracket 76 is generally L-shaped and includes an opening 78 which aligns with the opening 74 in the cradle bracket 70. A fastener 80, typically a threaded bolt, is inserted through the openings 74, 78 and tightened with a nut to secure the brackets 70, 76 to one another. A locking bracket 82 having a plurality of openings 84 which align with a plurality of openings 86 in the middle bracket 76 is fastened to the middle bracket 76 to form a length suitable for extending and securing a lock pin 88 to the trailer hitch 24. The lock pin 88 aligns with and extends through a hole in the trailer hitch 24 from beneath the trailer hitch 24. The lock pin 88 includes a hole 90 therethrough for inserting a lock 92, as for example, a padlock. The rear end of the locking bracket 82 includes a downwardly extending flange or lip 96 which can be used to expand or contract the telescoping cradle assembly 64 by pulling or pushing on the locking bracket 82.

A rim stabilizer 94 is attached to the cradle receiver member 62 for securing the spare tire 16 to the carrier apparatus 10. As shown in FIG. 5, the rim stabilizer 94 is a curved, elongated bar having a length approximating the diameter of the rim 17, typically 15 inches. The rim stabilizer 94 is firmly attached, as for example by a carriage bolt and nut, to the cradle receiver member 62. The ends of the rim stabilizer 94 are positioned within the outer diameter of the rim 17. The spare tire 16 lays horizontally on the cradle receiver member 62 and the rim stabilizer 94 is positioned inside the outer diameter of the rim 17 to hold the spare tire 16 in the storage position between the cradle receiver member 62 and the transverse frame members 19a, 19b of the vehicle 12.

It is important that the distance between the cradle receiver member 62 and the transverse frame members 19a, 19b be approximately the same as the width of the spare tire 16 to prevent the spare tire 16 from "jumping" off of the rim stabilizer 94 and to prevent the spare tire 16 from rattling when in the storage position. In order to accomodate various tire widths on different vehicles, typically ranging from 9 to 11 inches, the distance between the transverse frame members 19a, 19b and the cradle receiver member 62 can be adjusted by inserting one or more spacers 98 onto the spring rod 46 between the upper collar 48 and the elongated support member 32 to reduce the distance between the transverse frame members 19a, 19b and the cradle receiver member 62. Additionally, in order to maintain the cradle receiver member 62 in a substantially horizontal position, the vertical height of the cradle bracket 70 can be adjusted in the elongated slot 74 of the cradle bracket 70 until the cradle receiver member 62 is in the desired position at which time the fastener 80 is tightened to secure the cradle bracket 70 to the middle bracket 76.

To acess the spare tire 16, the lock 92 is removed from the lock pin 88. After removing the lock 92, the unsupported end of the cradle assembly 64 and the bracket assembly 68 are permitted to deflect towards the ground due primarily to the weight of the spare tire 16. However, the weight of the spare tire 16 is opposed by the flexural strength of the spring rod 46 which opposes the downward deflection of the unrestrained end of the cradle assembly 64. While allowing some downward deflection of the cradle assembly 64, the flexural strength of the spring rod 46 allows the spring rod 46 to deflect without permanently bending the spring rod 46. The locking bracket 82 can be pulled to extend the telescoping cradle assembly 64, and more specifically, the cradle receiver member 62 and the spare tire 16, to the rear of the vehicle 12 where the spare tire 16 can be lifted from the cradle assembly 64. Alternatively, the locking bracket 82 can be swung to either side of the vehicle 12 prior to extending the telescoping cradle assembly 64. The cradle assembly 64 and the spring rod 46 are free to rotate as a result of the spring rod connection to the carrier support member 32. After the telescoping cradle assembly 64 has been extended to the side of the vehicle 12, the spare tire 16 can be removed from the carrier apparatus 10. As the telescoping cradle assembly 64 extends to either the rear or sides of the vehicle 12, the spring rod 46 further deflects or bends as a result of the increased bending moment which further allows adequate clearance between the chassis 26 or the rear bumper 22 and the spare tire 16 to permit removal of the spare tire 16 from beneath the vehicle 12.

To place a spare tire 16 in the carrier apparatus 10 the same steps are repeated in reverse order. The spare tire 16 can be placed on the carrier apparatus 10 from either side of the vehicle 12 or from the rear. After positioning the cradle and bracket assemblies 64, 68 to the rear of the vehicle 12 or from the rear. After positioning the cradle and bracket assemblies 64, 68 to the rear of the vehicle 12, the locking bracket 82 is pushed towards the spring rod 46 to contract the telescoping cradle assembly 64 until the lock pin 88 aligns with a hole in the trailer hitch 24. Once the lock pin 88 has been inserted through the trailer hitch hole, the lock 92 is inserted through the hole 90 in the lock pin 88, thus securing the spare tire 16 and the carrier apparatus 10.

The foregoing disclosure and description of the invention is illustrative and explanatory thereof, and various changes in the size, shape, and materials, as well as in the details of illustrative construction and assembly, may be made without departing from the spirit of the invention.

I claim:

1. A carrier apparatus for use on a motor vehicle to store a spare tire mounted on a rim, the vehicle having an undercarriage, the carrier apparatus storing the spare tire beneath the undercarriage of the vehicle, comprising:

a spring rod having an upper end and a lower end;

means for mounting said upper end of said spring rod to the vehicle;

a cradle bar having a forward end attached to said lower end of said spring rod;

a cradle receiver member receiving said cradle bar to form a telescoping cradle, said cradle receiver member having a rear end; and a bracket assembly having a first end connected to said rear end of said cradle receiver member and a second end adapted to be secured to the vehicle, wherein said spring rod deflects as said cradle receiver member telescopingly extends from said cradle bar and returns to a substantially undeflected position as said cradle receiver member substantially receives said cradle bar.

2. The carrier apparatus according to claim 1, further comprising:

means for securing the spare tire to said cradle receiver member.

3. The carrier apparatus according to claim 2, wherein said securing means comprises a stabilizer member attached to said cradle receiver member, said stabilizer member having a length slightly less than the diameter of the rim of the spare tire.

4. The carrier apparatus according to claim 2, wherein said stabilizer member is substantially transverse to said cradle receiver member in a substantially horizontal position.

5. The carrier apparatus according to claim 1, wherein the vehicle includes a pair of longitudinal frame members and said mounting means comprises:

a support member having a first end and a second end, said first end adapted to engage one of the pair of frame members, said second end having a longitudinal opening extending along the length of said support member, wherein said spring rod is rotatably connected to said support member;

a rod having a first end adapted to engage the second frame member and a second end which is received by said longitudinal opening; and second means for securing said support member and said rod to the frame members.

6. The carrier apparatus according to claim 1, wherein said spring rod supports said telescoping cradle and the spare tire in a generally horizontal position when said cradle receiver member substantially receives said cradle bar.

7. The carrier apparatus according to claim 6, wherein said spring rod is made from spring steel.

8. A carrier apparatus for use on a motor vehicle to store a spare tire mounted on a rim, the vehicle having an undercarriage, the carrier apparatus storing the spare tire beneath the undercarriage of the vehicle, comprising:

a spring rod having an upper end and a lower end;

means for mounting said upper end of said spring rod to the vehicle;

a cradle bar having a forward end attached to said lower end of said spring rod and a rearward end;

a cradle receiver member receiving said cradle bar to form a telescoping cradle, said cradle receiver member having a rear end, wherein said telescoping cradle has a first position in which said cradle bar is substantially received by said cradle receiver member and said rearward end is located adjacent said rear end and a second position in which said receiving member and said cradle bar are in a telescoped position such that said rearward end and said rear end are in a spaced relationship;

a bracket assembly having a first end connected to said rear end of said cradle receiver member and a second end adapted to be secured to the vehicle; and means for securing the spare tire to said cradle receiver member, wherein said spring rod supports said telescoping cradle and the spare tire in a generally horizontal position when said telescoping cradle is in said first position and said second end of said bracket assembly is unsecured and unsupported and said telescoping cradle is no longer in a generally horizontal position when said telescoping cradle moves from said first position to said second position.

9. The carrier apparatus according to claim 8, wherein the vehicle includes a pair of longitudinal frame members and said mounting means comprises:

a support member having a first end and a second end, said first end adapted to engage one of the pair of frame members, said second end having a longitudinal opening extending along the length of said support member, wherein said spring rod is rotatably connected to said support member;

a threaded rod having a first end adapted to engage the second frame member and a second end which is received by said longitudinal opening; and second means for securing said support member and said rod the frame members.

10. The carrier apparatus according to claim 8, wherein said spring rod is made from spring steel.

11. A carrier apparatus for use on a motor vehicle to store a spare tire mounted on a rim, the vehicle having an undercarriage and a pair of longitudinal frame members, the carrier apparatus storing the spare tire beneath the undercarriage of the vehicle, comprising:

a spring rod having an upper end and a lower end;

a support member assembly connected to the longitudinal frame members, said spring rod being connected to said support member assembly;

a telescoping cradle assembly comprising an inner elongated member and an outer elongated member in sliding relationship to one another, said telescoping cradle assembly having a front end and a rear end, said front end of said telescoping cradle assembly connected to said lower end of said spring rod; and a bracket assembly having a first end connected to said rear end of said telescoping cradle assembly and a second end adapted to be secured to the vehicle, wherein said spring rod deflects as said cradle receiver member telescopingly extends from said cradle bar and returns to a substantially undeflected position a said cradle receiver member substantially receives said cradle bar.

12. The carrier apparatus according to claim 11, further comprising:

means for securing the spare tire to said telescoping cradle assembly.

13. The carrier apparatus according to claim 12, wherein said securing means comprising a stabilizer member attached to said cradle receiver member, said stabilizer member having a length slightly less than the diameter of the rim of the spare tire.

14. The carrier apparatus according to claim 13, wherein said stabilizer member is substantially transverse to said cradle receiver member in a substantially horizontal position.

15. The carrier apparatus according to claim 12, wherein the vehicle has a left side, a right side, and a rear and said telescoping cradle assembly is capable of rotating about said front end of said telescoping cradle assembly so that the spare tire may be removed from the telescoping cradle assembly from the rear or the sides of the vehicle.

16. The carrier apparatus according to claim 15, wherein said spring rod is made from spring steel and supports said telescoping cradle and the spare tire in a generally horizontal position when said cradle receiver member substantially receives said cradle bar.

17. A carrier apparatus for use on a motor vehicle to store a spare tire mounted on a rim, the vehicle having an undercarriage and a pair of longitudinal frame members, the carrier apparatus storing tire beneath the undercarriage of the vehicle, comprising:

a spring rod having an upper end and a lower end;

a support member having a first end and a second end, said first end adapted to engage one of the pair of frame members, said second end having a longitudinal opening extending along the length of said support member, wherein said spring rod is rotatably connected to said support member;

a threaded rod having a first end adapted to engage the second frame member and second end which is received by said longitudinal opening;

a plurality of threaded nuts threaded onto said threaded rod, said threaded nuts abutting one another and one of said threaded nuts abutting said second end of said support member to firmly secure said first end of said support member and said first end of said threaded rod to the frame members;

a cradle bard having a forward end attached to said lower end of said spring rod;

a cradle receiver member receiving said cradle bar to form a telescoping cradle, said cradle receiver member having a rear end; and a bracket assembly having a first end connected to said rear end of said cradle receiver member and a second end adapted to be secured to the vehicle.

18. A carrier apparatus for use on a motor vehicle to store a spare tire mounted on a rim, the vehicle having an undercarriage and a pair of longitudinal frame members the carrier apparatus storing the spare tire beneath the undercarriage of the vehicle, comprising:

a spring rod having an upper end and a lower end;

a support member having a first end and a second end, said first end adapted to engage one of the pair of frame members, said second end having a longitudinal opening extending along the length of said support member, wherein said spring rod is rotatably connected to said support member;

a threaded rod having a first end adapted to engage the second frame member and a second end which is received by said longitudinal opening;

a plurality of threaded nuts threaded onto said threaded rod, said threaded nuts abutting one another and one of said threaded nuts abutting said second end of said support member to firmly secure said first end of said support member and said first end of said threaded rod to the frame members;

a cradle bar having a forward end attached to said lower end of said spring rod;

a cradle receiver member receiving said cradle bar to form a telescoping cradle, said cradle receiver member having a rear end;

a bracket assembly having a first end connected to said rear end of said cradle receiver member and a second end adapted to be secured to the vehicle; and means for securing the spare tire to said cradle receiver member, wherein said spring rod supports said telescoping cradle and the spare tire in a generally horizontal position when said second end of said bracket assembly is unsecured and unsupported.

* * * * *